Patented Dec. 19, 1944

2,365,599

UNITED STATES PATENT OFFICE 2,365,599

TANNING AGENTS AND PROCESS FOR MAKING THEM

Erik Schirm, Dessau, Germany; vested in the Alien Property Custodian

No Drawing. Application June 19, 1941, Serial No. 398,772. In Germany July 8, 1940

8 Claims. (Cl. 260—124)

This invention relates to new tanning agents and their production.

I have found that commercially valuable condensation products may be obtained if sulfite waste liquor is condensed with aromatic sulfamides and with aldehydes, especially formaldehyde or substances giving off formaldehyde under the reaction conditions. By this process the tanning properties of the sulfite waste liquor are improved to such an extent that the condensation products will form valuable tannins, while the sulfite waste liquor itself, as is known, can only be regarded as auxiliary tanning agents.

The term "sulfite waste liquor" should be understood to mean the waste liquor obtained when disintegrating wood according to the sulfite process and the like, or the concentrates or dry substances that are obtained by evaporation and preferably such products freed from iron and lime.

Aromatic sulfamides or their nuclear substitution products suitable for use as raw materials for the present process are for instance: benzene sulfamide, 4-toluol sulfamide, 4-chlorbenzene sulfamide, benzene-1,3-disulfamide, diphenyl-4,4'-disulfamide, naphthalene-1,3,5-trisulfamide, carbazol-tetrasulfamide, benzoic acid-3-sulfamide, 2-hydroxy-benzoic acid-5-sulfamide, benzoic acid-3,5-disulfamide, phenol-2,4,6-trisulfamide, 1-hydroxy-naphthalene-8-sulfamide, 1-hydroxy-naphthalene-8-sulfamide-3-sulfoacid and so forth. Other suitable sulfamides, for the present process, are those obtained by the reaction of ammonia with the resinous sulfochlorides obtained by sulfonation of aromatic compounds in the presence of carbon tetrachloride. For instance, such aromatic sulfonic acid amides can be obtained by the sulfonation of cyclic compounds of the aromatic type, for example, benzene, naphthalene or their nuclear substitution products or carbazol, pyridine, thiophene and the like, with chlorsulfonic acid in presence of carbon tetrachloride. These resinous products contain sulfochloride groups and are of a viscous consistency in heated condition. When cold, the products are brown in color and hard in consistency.

The hydrocarbon radicals of the sulfamides, quite generally may contain substituents, such as methyl-, ethyl-, hydroxyl-, halogen-and like groups or hetero-atoms and heteroatomic groups, such as for instance ether-, sulfone-, ester-, sulfonamide-, carbonamide-groups and so forth.

The preferred aldehydes used as reagents in the present process include formaldehyde, acetaldehyde, glyoxyl, acrolein, croton-aldehyde, furfurol etc. or corresponding compounds giving off aldehyde during the reaction, such as para-formaldehyde, trioxy-methylene, formaldehyde-bisulfite, methylal, hexa-methylene-tetramine etc.

The process may be conducted also in such a manner that the preliminary condensation products are formed from the sulfamides and the aldehydes first and then these products are reacted with the sulfite waste liquor. As known condensation products of this kind there may be mentioned the N-methylol compounds of the sulfamides and their halogen-hydracid esters, that is, the N-halogen-methyl compounds of the sulfamides. Such compounds may be obtained, in a known manner, by the reaction of the aldehydes with the sulfamides, and with the proper amounts of hydrochloric-acid.

The conversion between the initial materials and the sulfite waste liquor takes place in an aqueous medium by heating to temperatures of about 100°. The conversion is completed as soon as the condensation product will form a clear solution in water.

Example 1

Six hundred forty parts by weight of sulfite waste liquor freed from iron and lime and evaporated to a powder, with a dry content of 93.6%, are stirred together with 360 parts by volume of water until a homogeneous syrup is formed. Now 250 parts by weight of N-methylol-p-toluol sulfamide are added and the mixture, after being rendered homogeneous by stirring, is heated to 90° and stirred at this temperature until a sample of the reaction mass forms a clear solution in a large quantity of cold water. After dilution with water and adjusting to a suitable pH value the reaction product is ready for use as a tannin.

Example 2

Four hundred twenty-six parts by weight of a finely powdered commercial mixture of benzene-1,3-disulfamide and benzene-1,4-disulfamide, such as is obtained by energetic sulfonation of benzene with an excess of chlorsulfonic acid and conversion of the isolated mixture of benzene-1,3-disulfochloride and benzene-1,4-disulfochloride with ammonia, are added to the syrupy sulfite waste liquor obtained according to Example 1 and the mixture thoroughly stirred. Thereupon 170 parts by weight of a solution of 40% aqueous formaldehyde are stirred into this mass at a temperature between 20 and 25° within a period of two hours and stirring is continued at ordinary temperature for about 5 hours. Now the mass is heated to a temperature between 90 and 100° and this temperature maintained for about three hours. At this time a sample of the reaction mass should form a clear solution in water. If this is the case, the reaction mixture is evaporated to dryness at reduced pressure and at the temperature of a water bath. The residue which is obtained yields 888 parts by weight and may easily be ground whereupon it forms a brownish gray powder which is readily soluble in water. The product is an excellent tanning agent.

In the aforegiven example the benzene disulfamide may be replaced by 250-300 parts by weight of naphthalene-1,3,5-trisulfamide or naphthalene-1,3,6-trisulfamide or by the same amount of a commercial mixture of isomeric naphthalene-trisulfamides. With the same mode of working a product is obtained which is similar to the afore described product.

Example 3

The benzene disulfamide obtained according to Example 2 is replaced by 266 parts by weight of a sulfamide having a nitrogen content of 10.5%, which sulfamide had been made by action of concentrated ammonia water upon a resinous sulfochloride obtained from naphthalene. The mode of working is in other respects the same as according to Example 2. In this case also there is obtained a powdery tannin which is readily soluble in water.

I claim:

1. A process for producing a tanning agent which comprises condensing a sulfite waste liquor with an aldehyde and an aromatic poly-sulfamide.

2. A process for producing a tanning agent which comprises condensing a sulfite waste liquor with formaldehyde and a benzene disulfamide.

3. A process for producing a tanning agent which comprises condensing a sulfite waste liquor with formaldehyde and a mixture of benzene-1,3-disulfamide and benzene-1,4-disulfamide.

4. A new tanning agent, the condensation product of a sulfite waste liquor with an aromatic polysulfamide and an aldehyde.

5. A new tanning agent, the condensation product of a sulfite waste liquor with formaldehyde and a benzene disulfamide.

6. A new tanning agent, the condensation product of a sulfite waste liquor with formaldehyde and a mixture of benzene-1,3-disulfamide and benzene-1,4-disulfamide.

7. A process for producing a tanning agent which comprises condensing a sulphite waste liquor with formaldehyde and a naphthalene trisulphamide.

8. A new tanning agent, a condensation product of a sulphite waste liquor with formaldehyde and a naphthalene trisulphamide.

ERIK SCHIRM.